(12) United States Patent
Chen et al.

(10) Patent No.: US 8,998,353 B2
(45) Date of Patent: Apr. 7, 2015

(54) HYBRID BRAKE CONTROL

(75) Inventors: Shih-Ken Chen, Troy, MI (US); Valery Pylypchuk, West Bloomfield, MI (US); Youssef A. Ghoneim, Rochester, MI (US); Weiwen Deng, Rochester Hills, MI (US); Nikolai K. Moshchuk, Grosse Pointe, MI (US); Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 934 days.

(21) Appl. No.: 12/876,422

(22) Filed: Sep. 7, 2010

(65) Prior Publication Data

US 2012/0055744 A1    Mar. 8, 2012

(51) Int. Cl.
*B60T 8/64* (2006.01)
*B60T 8/26* (2006.01)
*B60W 10/08* (2006.01)
(Continued)

(52) U.S. Cl.
CPC ............. *B60T 8/267* (2013.01); *B60T 2270/60* (2013.01); *B60T 2201/16* (2013.01); *B60T 2270/604* (2013.01); *B60W 10/08* (2013.01); *B60W 10/184* (2013.01); *B60W 10/188* (2013.01); *B60W 10/192* (2013.01); *B60W 30/02* (2013.01); *B60W 30/18127* (2013.01); *B60W 30/18145* (2013.01); *B60W 2510/244* (2013.01); *B60W 2540/18* (2013.01); *B60W 2710/182* (2013.01); *B60W 2720/28* (2013.01); *B60W 2720/30* (2013.01); *B60Y 2300/89* (2013.01)

(58) Field of Classification Search
CPC ... B60T 2270/60; B60T 2201/16; B60T 8/00; B60T 8/17; B60T 8/171; B60T 8/1755; B60T 8/17554; B60T 8/267

USPC .............. 303/152, 3, 15, 9.62, 155, 158, 188, 303/191, 20; 188/106 F, 106 P, 156, 159; 701/70, 72, 78
See application file for complete search history.

(56) References Cited

U.S. PATENT DOCUMENTS 5,358,317 A * 10/1994 Cikanek ...................... 303/152
6,222,334 B1    4/2001 Tamagawa et al.
(Continued)

FOREIGN PATENT DOCUMENTS

DE    102006055766 A1 * 10/2007
JP    2008301590 A * 12/2008
JP    2011 101 515 A    5/2011

OTHER PUBLICATIONS

English translation of DE-102006055766 A1.*
(Continued)

*Primary Examiner* — Melody Burch

(57) ABSTRACT

A method to control a vehicle including control of regenerative brakes and friction brakes includes monitoring a desired corner force and moment distribution, monitoring real-time actuator constraints including a braking torque limit of each of the regenerative brake, determining a regenerative braking torque for each of the regenerative brakes based upon the desired corner force and moment distribution and the real-time actuator constraints, determining a friction braking torque for each of the friction brakes based upon the desired corner force and moment distribution and the determined regenerative braking torque for each of the regenerative brakes, and controlling the vehicle based upon the determined regenerative braking torques and the determined friction braking torques.

17 Claims, 5 Drawing Sheets

(51) Int. Cl.
*B60W 10/184* (2012.01)
*B60W 30/02* (2012.01)
*B60W 30/18* (2012.01)
*B60T 13/74* (2006.01)
*B60W 10/188* (2012.01)
*B60W 10/192* (2012.01)

(56) References Cited

U.S. PATENT DOCUMENTS

| | | |
|---|---|---|
| 6,318,487 B2 | 11/2001 | Yanase et al. |
| 6,325,470 B1 * | 12/2001 | Schneider ............... 303/152 |
| 6,454,364 B1 | 9/2002 | Niwa et al. |
| 6,488,344 B2 | 12/2002 | Huls et al. |
| 6,837,552 B2 | 1/2005 | Reuter et al. |
| 7,427,849 B2 | 9/2008 | Kaneko et al. |
| 7,472,006 B2 | 12/2008 | Turski et al. |
| 2006/0155451 A1 | 7/2006 | Kuwahara et al. |
| 2006/0196712 A1 * | 9/2006 | Toyota et al. ............ 180/165 |
| 2007/0004553 A1 | 1/2007 | Oikawa et al. |
| 2007/0021875 A1 | 1/2007 | Naik et al. |
| 2008/0066976 A1 | 3/2008 | Yamada |
| 2008/0140283 A1 | 6/2008 | Kuwahara et al. |
| 2010/0268420 A1 * | 10/2010 | Yasui et al. .............. 701/41 |

OTHER PUBLICATIONS

U.S. Appl. No. 12/845,127, filed Jul. 28, 2010, Chen et al.
Svendenius, J., "PhD Thesis: Tire Modeling and Friction Estimation, Department of Automatic Control", Lund University, Lund, Apr. 2007.
He et al., "Experimental Evaluation of Dynamic Force Distribution Method for EV Motion Control", IEEE Ref. No. 1-4244-0844-X/07, pp. 682-687, 2007.
Hamada et al., "Development of Vehicle Dynamics Integrated Management", SAE Paper No. 2006-01-0922, Apr. 3-6, 2006.
Brach et al., "Modeling Combined Braking and Steering Tire Forces", SAE Paper No. 200-01-0357, Mar. 6-9, 2000.
Nicolas et al., "Predicting Directional Behavior of Tractor Semitrailers When Wheel Anti-Skid Brake Systems Are Used", Paper No. 72 WA/Aut-16, ADME Winter Annual Meeting, Nov. 26-30, 1972.
Pottinger et al., "Effectiveness of the Slip Circle, "Combinator", Model for Combined Tire Cornering and Braking Forces When Applied to a Range of Tires", SAE Paper 982747, Nov. 16-18, 1998, Warrendale, PA 15096.

* cited by examiner

HYBRID BRAKE CONTROL

TECHNICAL FIELD

This disclosure is related to vehicle control.

BACKGROUND

The statements in this section merely provide background information related to the present disclosure and may not constitute prior art.

Vehicle control describes methodologies wherein operation of a vehicle or of a system within a vehicle is monitored and computerized control is applied to modify the operation of the vehicle. Exemplary vehicle control strategies monitor vehicle dynamics or the current or expected forces and moments acting upon the vehicle and apply control methods based upon the forces and moments to maintain desired operation of the vehicle. For example, when a vehicle is stopping quickly, forces and moments can cause the body of the vehicle to rotate forward, compressing the front suspension. Vehicle control can counter such monitored or anticipated rotation of the body of the vehicle by energizing actuators located at the front corners of the vehicle to lift up on the vehicle body and stop the front suspension from compressing. In another example, in a braking maneuver, forces and moments acting upon the vehicle and braking forces being applied to the wheels can be used to monitor or predict slippage between a wheel and the road. Actuators at the brakes of the vehicle can be used to redistribute braking force among the wheels to avoid slippage. In another example, in a turning maneuver, forces and moments acting upon the vehicle and a steering angle can be used to monitor or predict an over-steer or an under-steer condition, and an actuator acting upon the steering system can correct the steering. In another example, forces acting upon the vehicle and a current torque being applied to the drivetrain and the wheels can be used to monitor or predict slippage between the wheels and the road, and an actuator can be used to modify the torque being transmitted to the wheels through various methods known in the art.

A number of systems can be monitored or affected through vehicle control. Examples include braking, steering, driveline, and suspension control. According to an exemplary method, driver commands and/or autonomous driving system commands are integrated to determine desired vehicle dynamic or kinematic states, a vehicle dynamics module inputs the desired vehicle dynamic or kinematic states and outputs a desired vehicle force and/or moment, and an actuator supervisory control module generates commands in one or more vehicle systems to effect the desired vehicle force and/or moment. Integration of the commands can include feedback regarding current or resultant vehicle dynamic or kinematic states, and the actuator supervisory control module can include feedback of current or resultant actuator states.

SUMMARY

A method to control a vehicle including control of regenerative brakes and friction brakes includes monitoring a desired corner force and moment distribution, monitoring real-time actuator constraints including a braking torque limit of each of the regenerative brake, determining a regenerative braking torque for each of the regenerative brakes based upon the desired corner force and moment distribution and the real-time actuator constraints, determining a friction braking torque for each of the friction brakes based upon the desired corner force and moment distribution and the determined regenerative braking torque for each of the regenerative brakes, and controlling the vehicle based upon the determined regenerative braking torques and the determined friction braking torques.

BRIEF DESCRIPTION OF THE DRAWINGS

One or more embodiments will now be described, by way of example, with reference to the accompanying drawings, in which.

DETAILED DESCRIPTION

Figure 1:
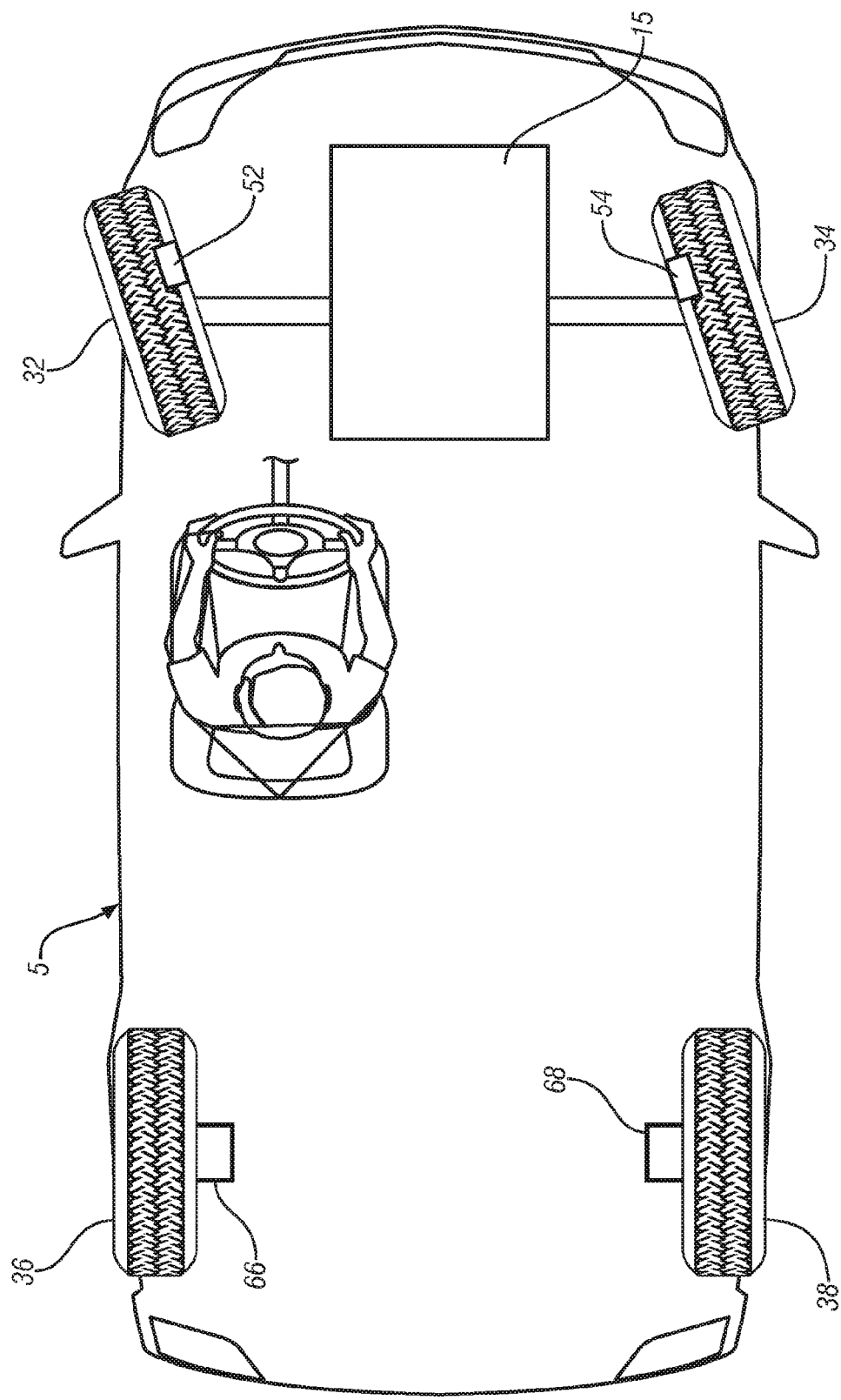
FIG. 1 schematically depicts an exemplary vehicle including systems affected by vehicle control, in accordance with the present disclosure.

Referring now to the drawings, wherein the showings are for the purpose of illustrating certain exemplary embodiments only and not for the purpose of limiting the same, FIG. 1 schematically depicts an exemplary vehicle including systems affected by vehicle control, in accordance with the present disclosure. Vehicle 5 includes electric motor 15 and wheels 32, 34, 36 and 38. Electric motor 15 can provide torque that can be used to propel the vehicle 5 through wheels 32 and 34. Additionally, electric motor 15 can act as a regenerative brake for each of wheels 32 and 34. The exemplary configuration of FIG. 1 describes one possible powertrain that can be utilized for a vehicle. A number of exemplary embodiments can equally be utilized. For example, a plurality of in-wheel motors can be utilized in place of the depicted motor 15. In one such embodiment, four in-wheel motors can individually provide torque to each of the wheels. FIG. 1 depicts exemplary regenerative brakes 66 and 68 operating to provide regenerative braking torque to respective wheels 36 and 38. The disclosure is not intended to be limited to the particular powertrain embodiments described herein. FIG. 1 depicts wheels 32 and 34 turning or capable of steering. It will be appreciated that a number of exemplary steering methods and wheel configurations are known, including four wheel steering, and the disclosure is not intended to be limited to the particular exemplary embodiments depicted herein. At each of wheels 32 and 34, friction brakes or friction braking devices 52 and 54, respectively, are depicted, each capable of applying a friction braking torque to the associated wheel. A number of different braking devices and control methods are known in the art, and can include exemplary hydraulic brakes, or electromechanical brakes, and regenerative braking capable of charging an energy storage device.

As described above, methods are known to utilize actuators to modify the operation of various vehicle systems for purposes of vehicle control. For braking systems, electronic stability control systems (ESC) and antilock braking systems are systems that modulate braking actuation based upon inputs. Vehicle control inputs can be utilized to change the operation of the ESC or antilock braking systems to affect actuator control of braking. ESC, antilock braking systems, or other braking control systems can use hydraulic actuators with pumps and valves, self-pressurized systems, electric motors, or electric calipers to affect actuator control of braking. The disclosure is not intended to be limited to the particular exemplary embodiments described herein.

Commonly assigned U.S. Pat. No. 7,472,006 is entitled "VEHICLE DYNAMICS CONTROL STRUCTURE" describes a method to implement vehicle control based upon coordinating individual vehicle systems and is hereby incorporated by reference.

Figure 2:
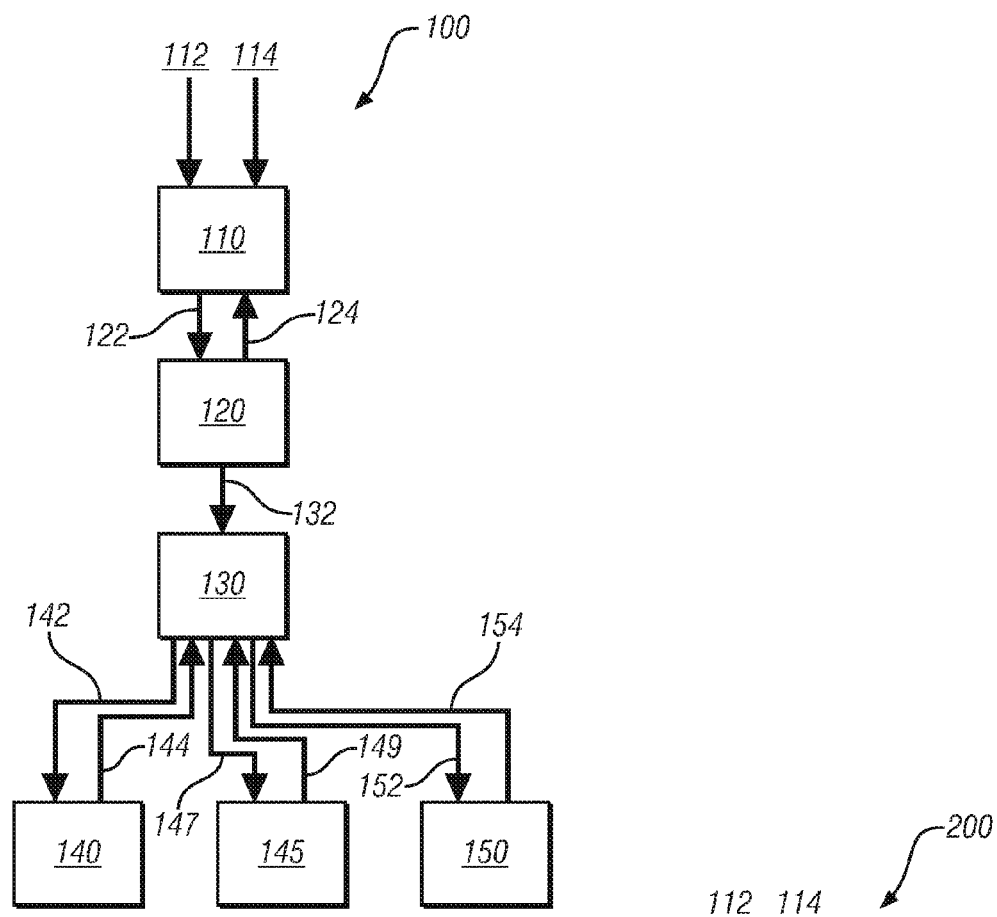
FIG. 2 schematically depicts a method to coordinate vehicle control for various vehicle systems, in accordance with the present disclosure.

FIG. 2 schematically depicts a method to coordinate vehicle control methods for various vehicle sub-systems, in accordance with the present disclosure. Method 100 includes command integration module 110 monitoring manual driving inputs 112 and/or sensor guided autonomous driving inputs 114 and generates desired vehicle dynamics/kinematics 122, describing vehicle operation desired by the driver or autonomous feature of the vehicle. Vehicle dynamics module 120 inputs desired vehicle dynamics/kinematics 122 and generates a desired vehicle force and moment 132, for example, describing forces and a moment acting upon the center of gravity of the vehicle, and resultant vehicle dynamics/kinematics 124. In the exemplary embodiment of FIG. 2, command integration module 110 additionally monitors resultant vehicle dynamics/kinematics 124 and can utilize this signal to provide feedback to the desired vehicle dynamics/kinematics 122 signal. Actuator supervisory control module 130 inputs desired vehicle force and moment 132 and generates control commands 142, 147 and 152 to respective actuator modules 140, 145 and 150 providing control commands to different systems within the vehicle, as described above. In one non-limiting example, actuator module 140 can include a module providing commands to a regenerative braking system, actuator module 145 can include a module providing commands to a friction system, and module 150 can include a module providing commands to a propulsion system.

Method 100 provides for integrated control of various vehicle systems for vehicle control. Actuator supervisory control module 130 applies methods and programmed responses to the desired vehicle force and moment 132 to the various vehicle systems commanded by module 140, 145 and 150. However, these methods and programmed responses are feature-based responses, for example, a desired moment is identified, and a response including modification of a steering angle is generated. Such a response is still an isolated function for that vehicle system.

A corner dynamics control method is applied to a vehicle control method, determining a desired corner force and moment distribution for every wheel of the vehicle. By distributing a desired vehicle force and moment as a desired corner force and moment to each of the corners of the vehicle, a response of the various systems affecting a particular corner can be selectively generated based upon the desired force and moment for that corner. Such a method implements vehicle control as a net effect of all of the vehicle systems controlled rather than controlling the individual system piecemeal. Further, by distributing the desired force and moment to the four corner of the vehicle, real-time corner constraints or constraints describing an ability of each corner to contribute to vehicle control can be applied as part of the distribution, ensuring that the desired corner force and moment distribution is within a desired range for each corner and not in a near-limit condition. In this way, integration of various vehicle systems can be achieved based upon the vehicle response to the entirety of the systems being controlled. Further, by unifying control based upon desired forces and moments acting upon the vehicle, the control parameters can be standardized or customizable for vehicle configuration and driver preferences.

Figure 3:
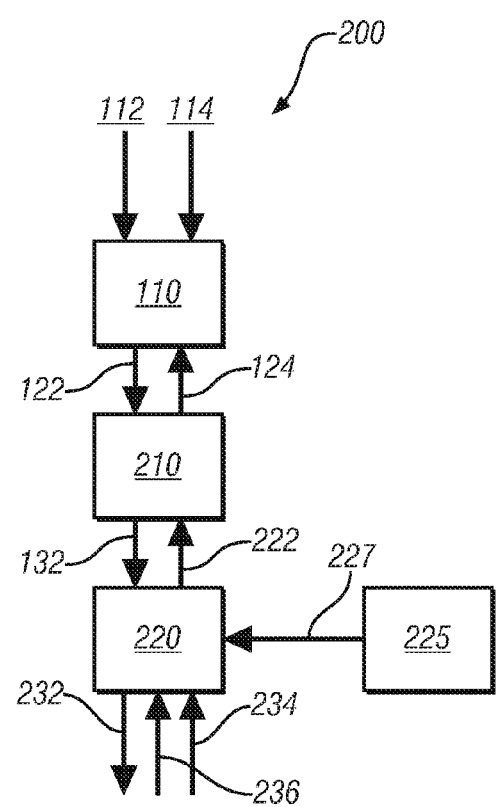
FIG. 3 schematically depicts an exemplary method to coordinate vehicle control by determining a desired corner force and moment distribution, in accordance with the present disclosure.

FIG. 3 schematically depicts a method to coordinate vehicle control methods by determining a desired corner force and moment distribution, in accordance with the present disclosure. Method 200 includes command integration module 110 monitoring manual driving inputs 112 and/or sensor guided autonomous driving inputs 114 and generates desired vehicle dynamics/kinematics 122, describing vehicle operation desired by the driver of the vehicle or a desired vehicle longitudinal, lateral forces and yaw moment. This vehicle operation desired by the driver, including manual and automatic inputs synthesized as desired vehicle dynamics/kinematics, can be described as an overall vehicle control command. According to one exemplary embodiment, command integration module 110 utilizes an inverse vehicle dynamics model. Additionally, command integration module 110 can monitor resultant vehicle dynamics/kinematics 124, as described above. Such resultant vehicle dynamics or kinematics can be developed by sensor or measurement systems, for example, monitoring a yaw rate, lateral acceleration, longitudinal acceleration, wheel speeds, estimated tire slip, estimated forces, and/or estimated friction between the wheels and the road surface. Vehicle dynamics module 210 inputs desired vehicle dynamics/kinematics 122 and generates desired vehicle force and moment 132 and resulting vehicle dynamics/kinematics 124. Corner dynamics control module 220 is depicted, monitoring desired vehicle force and moment 132. Corner dynamics control module 220 further monitors corner-based real-time constraints 227 from real-time constraints module 225. According to exemplary operation, module 220 minimizes a difference between desired and actual vehicle forces and moments, minimizes a control effort, and minimizes an occurrence of wheel instability such as excessive brake or traction slip. The optimization is constrained by the real-time constraints, for example, providing actuator limits, data regarding actuator anomalies, and energy management requirements. Exemplary corner-based real-time constraints 227 include a corner state of health and a corner capacity. Corner state of health or a corner capacity determination can include an ability or capacity of an actuator or actuators to produce the desired force at a particular corner. For example, a corner state of health can describe, in relation to an in-wheel motor, a lack of capability to achieve a desired corner force. If the actuator fails, it is not possible to apply the required control action to this corner, and a corner state of health determination can describe the actuator as non-functional. A corner capacity determination can describe an ability of the actuator/actuators to achieve the corner force required, for example, based upon an actuator approaching a heat limit and a resulting a limited control action. Corner dynamics control module 220 may further monitor a resultant tire slip/slip angle 234 and a resultant corner force and moment 236. Based upon monitored inputs, corner dynamics control module 220 generates desired corner force and moment distribution 232. Further, corner dynamics control module 220 can generate a resultant vehicle force and moment 222, which can be utilized as feedback by vehicle dynamics module 210. In this way, a desired vehicle force and moment can be utilized to develop a desired corner force and moment distribution for use in vehicle control.

Vehicle control can take a number of embodiments. As described in association with FIG. 2, vehicle control can include commands instructing a group of actuators controlling a vehicle sub-system or a group of vehicle sub-systems. Control of such actuators can implement a desired corner force and moment distribution as developed in FIG. 3. A number of sub-system control methods are known in the art, and the disclosure is not intended to be limited to the particular exemplary embodiments described herein.

Figure 4:
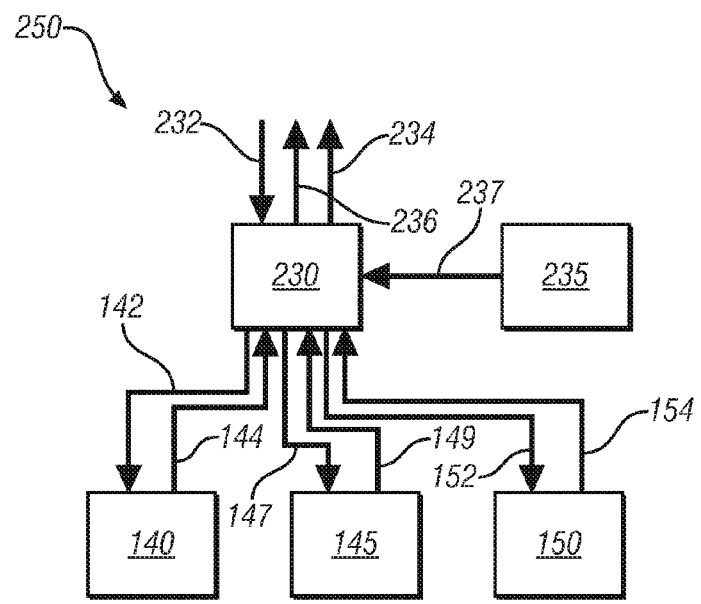
FIG. 4 schematically depicts a method to coordinate vehicle control for various vehicle systems utilizing a desired corner force and moment distribution, in accordance with the present disclosure.

FIG. 4 schematically depicts a method to coordinate vehicle control methods for various vehicle systems utilizing a desired corner force and moment distribution as depicted in FIG. 3, in accordance with the present disclosure. Method 250 includes an actuator supervisory control module 230 monitoring desired corner force and moment distribution 232 and generating control commands 142, 147 and 152 to respective actuator modules 140, 145 and 150 providing control commands to different sub-systems within the vehicle, as described above. Actuator supervisory control module 230 may further monitor additional real-time constraints 237 from real-time constraints module 235, for example, applying energy capacity and actuator limit information to the generation of control commands. Actuator supervisory control module 230 may further generate resultant tire slip/slip angle 234 and a resultant corner force and moment 236 for feedback to corner dynamics control module 220.

Figures 5, 6:
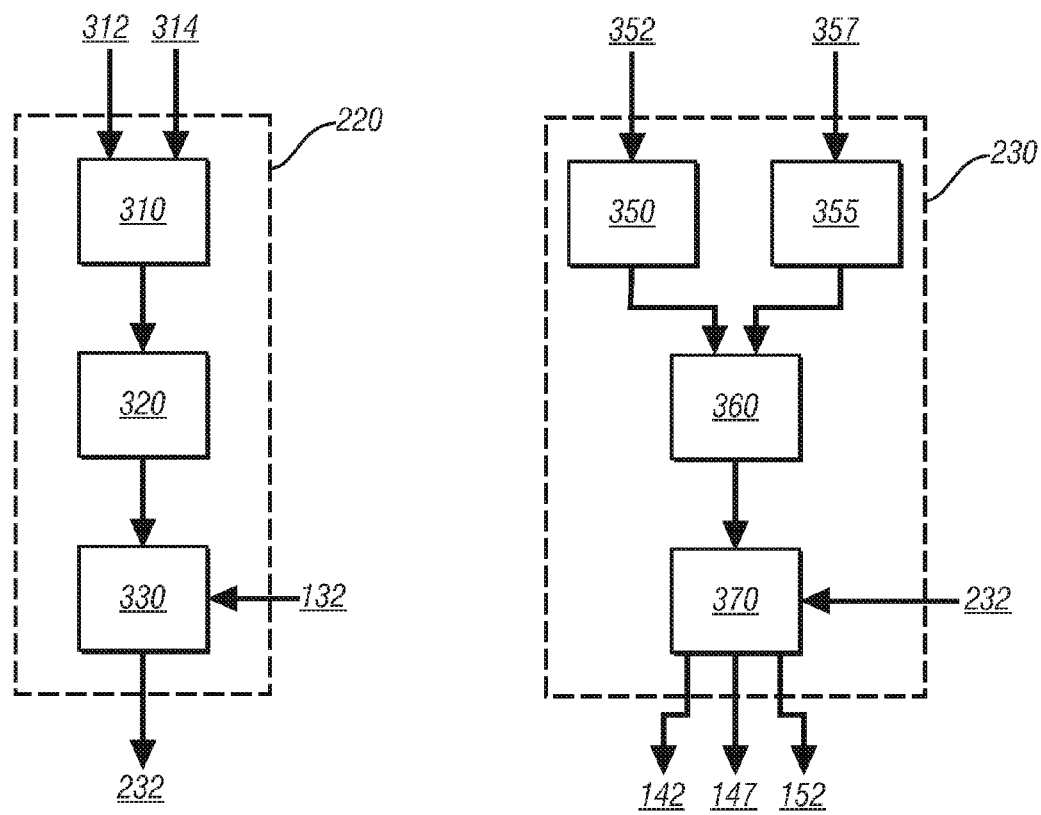
FIG. 5 schematically depicts exemplary operation of a corner dynamics control module in greater detail, in accordance with the present disclosure.
FIG. 6 schematically depicts exemplary operation of an actuator supervisor control module in greater detail, in accordance with the present disclosure.

FIG. 5 schematically depicts exemplary operation of a corner dynamics control module in greater detail, in accordance with the present disclosure. Corner dynamics control module 220 is depicted, including corner capacity assessment module 310, system constraints integration module 320, and optimized corner force distribution module 330. Corner capacity assessment module 310 monitors corner-based real-time constraints, in this exemplary embodiment, including corner state of health 312 and corner capacity 314. Corner state of health 312 and corner capacity 314 used as inputs can be used to describe how much force and moment a particular corner can desirably handle in current conditions. System constraints integration module 320 monitors the assessment of corner capacity from module 310 and determines how individual corners, as constrained or limited, can contribute to vehicle control. Module 320 outputs the constrained corner parameters to the optimized corner force distribution module 330. Optimized corner force distribution module 330 inputs the output of module 320 and desired vehicle force and moment 132 and distributes the force and moment to the various wheels as desired corner force and moment distribution 232.

FIG. 6 schematically depicts exemplary operation of an actuator supervisor control module in greater detail, in accordance with the present disclosure. Actuator supervisory control module 230 is depicted, including energy capacity assessment module 350, actuators assessment module 355, system constraints integration module 360, and optimized actuator control allocation module 370. Energy capacity assessment module 350 monitors real-time constraints, in this exemplary embodiment, including energy capacity information 352 regarding a desired power needed from a power supply, for example, from an internal combustion engine, fuel cell, or battery, considering the desired tractive forces. By monitoring energy capacity information 352, a selection of a power source and application of that source can be made based upon power availability in real-time. Actuators assessment module 355 monitors real-time actuator constraints, in this exemplary embodiment, including actuator limits/states of health 357. Real-time actuator constraints can include braking torque limits of regenerative brakes. Additionally, the real-time actuator constraints can include braking torque limits of friction brakes. Further, actuator limits or states of health can include, for example, a reduction of actuator capacity due to variation of temperature or due to a particular vehicle state. Energy capacity information 352 and actuators limits/states of health 357 as inputs can be used to describe how much force and moment a particular corner can desirably handle in current conditions. System constraints integration module 360 utilizes inputs to determine how individual actuators can contribute to the corner control and outputs parameters describing corner actuator limits (maximum torque, actuator bandwidth, etc.) to the optimized actuator control module 370. Optimized actuator control allocation module 370 inputs the output of module 360 and desired corner force and moment distribution 232 and generates control commands to relevant actuators, in this example, commands 142, 147 and 152.

Actuator anomalies can reduce the ability of a vehicle control system to react to vehicle operation. For example, if an actuator is non-functional or does not react to commands generated by the vehicle control system, benefits from the vehicle control system can be negated or adverse effects to drivability can be apparent. Based upon a system utilizing a corner dynamics control module as described herein monitoring actuator function and determining an actuator to be non-functional, distribution of force and moment to the various corners can be adjusted to compensate for the known actuator anomaly.

According to one exemplary vehicle configuration, a vehicle can utilize, in parallel or selectively, both regenerative braking and friction braking to reduce the speed of the vehicle. In the exemplary configuration depicted in FIG. 1, a vehicle is depicted utilizing regenerative brakes on the rear wheels, the primary motor as a regenerative brake for each of the two front wheels, and friction brakes on the front wheels, with the brakes of all four wheels cooperatively operating to slow the vehicle. It will be appreciated that braking force applied to different wheels of the vehicle can affect the magnitude of braking force that can be applied to the vehicle and the stability of the vehicle. For example, under a rapid stop, braking force applied the front wheels of the vehicle can under some circumstances be more effective in stopping the vehicle than braking force applied to the rear wheels. In another example, braking force applied to one or both of the rear wheels can improve stability of the vehicle during a stop. Additionally, braking devices have limits of operation. For example, a wheel can only apply a certain amount of braking force based upon a limit to friction between the wheels and the road. Regenerative braking may have a limit based upon the physical limits of the device or the amount of energy that can be imparted to the energy storage device. Such limits of each wheel or corner of the vehicle to apply a braking force can be described as real-time actuator constraints, for example, including actuator limits/states of health 357 described above as inputs to actuators assessment module 355. According to one exemplary method, the regenerative braking of the rear wheels are utilized to a maximum capacity and are augmented by operation of the friction braking of the front wheels based upon the capacity of the regenerative braking and the desired braking of the vehicle.

Vehicle control methods based upon a desired force and moment acting upon the vehicle center of gravity of a vehicle may include open-loop table-lookup values, for example calibrated through intensive tuning for various driving conditions, or iterative calculations such as a least square method to achieve optimal performance, each individually controlling vehicle systems based upon the desired force and moment. However, these methods, including calibrated responses for the various vehicle systems to the desired force and moment input react based upon the behavior of that particular system or calibrated response. As a result, such responses include optimized minimum or maximum values for that given system that are local to that system. However, viewing the vehicle control response as a whole including all of the vehicle systems controlled, such local minimum or maximum values for a particular system or for a specific calibration can be different from an optimized vehicle-wide solution including responses based upon desired corner force and moment distribution. Further, iterative calculations for vehicle control can include a delay while the iterative calculations are resolved to a solution. Under dynamic or urgent driving conditions, such a delay can be undesirable for vehicle control methods. Instead, a closed-loop calculation can be preferable for vehicle control wherein a determinative answer can be solved for a given set of inputs.

The methods of the present disclosure include closed-loop calculations based upon finding an optimal solution in a closed-form that helps to avoid iteration and reduces the need for intensive tuning the controller. Vehicle longitudinal and lateral forces and yaw moment at the center of gravity can be determined based upon tire forces. Ignoring self-aligning tire moments, vehicle dynamic equations describing longitudinal force upon the vehicle, $F_x$, lateral force upon the vehicle, $F_y$, and moment acting on a horizontal plane upon the vehicle, $G_z$, can be expressed as follows.

$$F_x = F_x(F_{x1}, F_{y1}, F_{x2}, F_{y2}, F_{x3}, F_{y3}, F_{x4}, F_{y4}) \quad [1]$$

$$F_y = F_y(F_{x1}, F_{y1}, F_{x2}, F_{ye}, F_{x3}, F_{y3}, F_{x4}, F_{y4}) \quad [2]$$

$$G_z = G_z(F_{x1}, F_{y1}, F_{x2}, F_{y2}, F_{x3}, F_{y3}, F_{x4}, F_{y4}) \quad [3]$$

Subscripts indicate the forces acting upon each of the individual tires. Equations 1-3 describing the forces acting at the vehicle's center of gravity as resultants of those applied from the road surface to the four tires can be expressed in the following linear form.

$$\begin{bmatrix} F_x \\ F_y \\ G_z \end{bmatrix} = A_F^{3\times 8} [F_{x1}, F_{y1}, F_{x2}, F_{y2}, F_{x3}, F_{y3}, F_{x4}, F_{y4}]^T \quad [4]$$

The term $A_F^{3\times 8}$ describes a matrix that depends upon the vehicle geometry and road wheel angles as follows:

$$A_F = \begin{bmatrix} \cos\delta_1 & -\sin\delta_1 & \cos\delta_2 \\ \sin\delta_1 & \cos\delta_1 & \sin\delta_2 \\ -\left(\frac{T}{2}\right)\cos\delta_1 + a\sin\delta_1 & a\cos\delta_1 + \left(\frac{T}{2}\right)\sin\delta_1 & \left(\frac{T}{2}\right)\cos\delta_2 + a\sin\delta_2 \end{bmatrix}$$

-continued $$\begin{matrix} -\sin\delta_2 & \cos\delta_3 & -\sin\delta_3 \\ \cos\delta_2 & \sin\delta_3 & \cos\delta_3 \\ a\cos\delta_2 - \left(\frac{T}{2}\right)\sin\delta_2 & -\left(\frac{T}{2}\right)\cos\delta_3 - b\sin\delta_3 & -b\cos\delta_3 + \left(\frac{T}{2}\right)\sin\delta_3 \end{matrix} \cdots$$

$$\begin{matrix} \cos\delta_4 & -\sin\delta_4 \\ \sin\delta_4 & \cos\delta_4 \\ \left(\frac{T}{2}\right)\cos\delta_4 - b\sin\delta_4 & -b\cos\delta_4 + \left(\frac{T}{2}\right)\sin\delta_4 \end{matrix}$$

The term T describes a track width or a width defined by the distance between the centerlines of tires on a left and right side of the vehicle at the ground level. The term $\delta_i$ describes the steer angle for each of the wheels. The terms a and b represent the distances between the center of gravity and the front and rear axles, respectively.

The linear form of the vehicle dynamic equations with respect to the corner forces enables use of an exemplary standard optimization methodology as follows.

$$\begin{bmatrix} F_x^* - F_x(f+\delta f) \\ F_y^* - F_y(f+\delta f) \\ G_z^* - G_z(f+\delta f) \end{bmatrix} = \begin{bmatrix} F_x^* - F_x - \frac{dF_x}{df}\delta f \\ F_y^* - F_y - \frac{dF_y}{df}\delta f \\ G_z^* - G_z - \frac{dG_z}{df}\delta f \end{bmatrix} = \begin{bmatrix} F_x^* - F_x \\ F_y^* - F_y \\ G_z^* - G_z \end{bmatrix} - \begin{bmatrix} \frac{dF_x}{df} \\ \frac{dF_y}{df} \\ \frac{dG_z}{df} \end{bmatrix} \delta f \quad [6]$$

The terms f and $\delta f$ describe vectors of tire forces and corner force control adjustments, respectively. The terms $F_x^*$, $F_y^*$ and $G_z^*$ describe target or desired longitudinal force, lateral force, and the rotational moment, respectively, determined by the driver command interpreter. Optimization of the vehicle dynamics can be accomplished by minimizing an error vector, E. The error vector is introduced in Equation 6 as follows.

$$E = \begin{bmatrix} F_x^* - F_x \\ F_y^* - F_y \\ G_z^* - G_z \end{bmatrix} \quad [7]$$

Similarly, a tire forces-center of gravity forces transition matrix, $A_F$, can be described as follows.

$$A_F = \begin{bmatrix} \frac{dF_x}{df} \\ \frac{dF_y}{df} \\ \frac{dG_z}{df} \end{bmatrix} \quad [8]$$

Equation 6 therefore yields the following equation.

$$\begin{bmatrix} F_x^* - F_x(f+\delta f) \\ F_y^* - F_y(f+\delta f) \\ G_z^* - G_z(f+\delta f) \end{bmatrix} = E - A_F \delta f \quad [9]$$

The terms ($E-A_F\delta f$) can collectively be described as a closed loop tracking error. The term $\delta f$ is the tire force variation to be determined. The following expression describes a friction ellipse physical constraint on tire force distribution due to tire characteristics.

$$\left[\left(\frac{F_{xi}+\delta F_{xi}}{F_{xi,max}}\right)^2 + \left(\frac{F_{yi}+\delta F_{yi}}{F_{yi,max}}\right)^2\right] \leq 1 \quad [10]$$

$F_{xi,max}$ and $F_{yi,max}$ describe maximum forces that can be exerted by the tires in longitudinal and lateral directions, respectively, and can be described as follows.

$$F_{xi,max} = \mu_x F_{zi} \quad [11]$$

$$F_{yi,max} = \mu_y F_{zi} \quad [12]$$

Equation 9 and 10 together can be utilized to optimize corner force distribution by minimizing the following cost function.

$$P = \frac{1}{2}(E - A_F \cdot \delta f)^T W_E (E - A_F \cdot \delta f) + \quad [13]$$
$$\frac{1}{2}\delta f^T W_{df} \delta f + \frac{1}{2}(f + \delta f)^T W_f (f + \delta f)$$

Of the components of Equation 13, the following expression describes a center of gravity force error component or error expression to be minimized:

$$\frac{1}{2}(E - A_F \cdot \delta f)^T W_E (E - A_F \cdot \delta f) \quad [14]$$

Of the components of Equation 13, the following expression describes a constraint on tire force control variation or control energy component to be minimized:

$$\frac{1}{2}\delta f^T W_{df} \delta f \quad [15]$$

Of the components of Equation 13, the following expression describes a fast growing tire force near the friction ellipse of any tire or an expression describing tire force reserve component to be maximized:

$$\frac{1}{2}(f + \delta f)^T W_f (f + \delta f) \quad [16]$$

In order to minimize the number of parameters, all the weighting matrixes can be represented in the diagonal form, as follows.

$$\rho_{0i}^2 = \left[\left(\frac{F_{xi}}{F_{xi,max}}\right)^2 + \left(\frac{F_{yi}}{F_{yi,max}}\right)^2\right] \quad [17]$$

$$W_f = \text{diag}[w(\rho_{01}^2), w(\rho_{01}^2), \ldots, w(\rho_{04}^2), w(\rho_{04}^2)] \quad [18]$$

$$W_E = \text{diag}[W_{Fx}, W_{Fy}, W_{Gz}] \quad [19]$$

$$W_{df} = \text{diag}[W_{\delta Fx1}, W_{\delta Fy1}, \ldots, W_{\delta Fx4}, W_{\delta Fy4}] \quad [20]$$

It is essential that Equation 17 includes no tire force control variations as compared to Equation 10. As a result, the cost function from Equation 13 has the quadratic form with respect to tire force control adjustments.

Using Equation 13 and assuming as a necessary condition for finding a minimum that $$\frac{dP}{d\delta f} = 0,$$

a closed form solution for determining optimized tire force distribution or a real-time closed form dynamics optimization solution is obtained in the form as follows.

$$\delta f = [W_f + W_{df} + (A_F^T W_E) A_F]^{-1} [A_F^T (W_E E) - W_f f] \det[W_f + W_{df} + (A_F^T W_E) A_F] \neq 0 \quad [21]$$

In this way, a system including exemplary corner dynamics control module 220 can generate the exemplary desired corner force and moment distribution 232 signal described above, which can subsequently be used in vehicle control, as described above.

The desired corner force and moment distribution is based upon inputs including driver inputs, can be based upon or incorporate a desired braking command, for example, describing a desired braking torque. Q desired describes a total torque value for the vehicle that the four corners of the vehicle or the braking systems of the wheels of the vehicle are commanded to generate. However, these commands must be distributed as corner specific and brake system specific commands. As described above, a desired corner force and moment distribution can be determined describing a force and moment desired of each corner of the vehicle. Based upon the methods described above, terms $F_{x1}$, $F_{x2}$, $F_{x3}$, $F_{x4}$ can be determined, describing desired longitudinal forces distributed to each corner of the vehicle. A desired braking torque for each wheel or corner of the vehicle, $Q_i^{desired}$, can be determined as a function of $F_{xi}$, as expressed by the following.

$$Q_i^{desired} = \frac{F_{xi}}{R_{effective}} \quad [22]$$

$R_{effective}$ describes an effective radius of the wheel and can be used to describe not only an actual radius of the wheel, describing a relationship of torque to axial force at the circumference of a wheel, but also the effects of other factors upon a force resulting from a torque applied.

An exemplary method to control braking in a vehicle includes determining and minimizing force and moment errors. Corner-based actuator torque equations can be expressed as follows.

$$\underbrace{\begin{bmatrix} Q_1^m \\ Q_2^m \\ Q_3^m \\ Q_4^m \\ Q_1^b \\ Q_2^b \end{bmatrix}}_{u} = \underbrace{\begin{bmatrix} 1-\lambda_1 & 0 & 0 & 0 \\ 0 & 1-\lambda_2 & 0 & 0 \\ 0 & 0 & 1-\lambda_3 & 0 \\ 0 & 0 & 0 & 1-\lambda_4 \\ \lambda_1 + \varepsilon_1 & 0 & 0 & 0 \\ 0 & \lambda_2 + \varepsilon_2 & 0 & 0 \end{bmatrix}}_{B} \underbrace{\begin{bmatrix} Q_1^{desired} \\ Q_2^{desired} \\ Q_3^{desired} \\ Q_4^{desired} \end{bmatrix}}_{v} \quad [23]$$

$Q_i^m$ describes regenerative braking torque applied by motors or regenerative dampers at each of the four wheels. $Q_i^b$ describes friction braking torque applied to each of the front wheels. The resultant torque at each of the front corners i=1, 2 can be described as a sum of $Q_i^m$ and $Q_i^b$. $\lambda_i$ and $\epsilon_i$ are control variables. $\lambda$ describes a friction braking distribution ratio, wherein at zero, all braking is performed by regenerative braking and, at one, all braking is performed by friction braking. $\epsilon$ provides necessary increase of friction torques on the front wheels when regenerative braking torques on the rear wheels are insufficient to meet the desired longitudinal force and yaw moment applied to the vehicle center of gravity. A measured or actual center of gravity force and moment, $F_{CG}^{actual}$, can be described as follows:

$$F_{CG}^{actual} = \begin{bmatrix} F_x \\ F_y \\ G_z \end{bmatrix} = A_Q(\delta) \begin{bmatrix} Q_1 \\ Q_2 \\ Q_3 \\ Q_4 \end{bmatrix} \quad [24]$$

$A_Q$ describes a corner to center of gravity transformation matrix and $Q_i$ (i=1,2,3,4) describes the resultant torque on each of the four wheels. By determining a desired center of gravity force and moment, $F_{CG}^{desired}$, and comparing it to $F_{CG}^{actual}$, a center of gravity force error can be determined and minimized. Such a minimizing of force errors can be described by the following expression $$\min_{[\epsilon_1, \epsilon_2]} \|(F_{CG}^{actual} - F_{CG}^{desired})\| \quad [25]$$

under the following constraint conditions.

$$Q_i^{m\_min} < Q_i^m(t) < Q_i^{m\_max} \quad [26]$$

$$Q_i^{b\_min} < (t) < Q_i^b(t) < 0 \quad [27]$$

$$W(t) = \Sigma_{i=1}^4 \omega_i Q_i^m(t) = -\Sigma_{i=1}^4 \omega_i (1-\lambda_i) Q_i^{desired}(t) = N\lambda - \Sigma_{i=1}^4 \omega_i Q_i^{desired}(t) \leq W^{max}(t) \quad [28]$$

$Q^{m\_min}$ describes a braking torque limit of the regenerative brakes, and $Q_i^{m\_max}$ describes a driving torque limit. In Equation 26, the electric motor torque $Q_i^m(t)$ has the lower negative limit $Q_i^{m\_min} < 0$ available for braking and the upper positive limit $Q_i^{m\_max} > 0$ available for driving. In Equation 27, $Q_i^{b\_min}$ is a negative number and describes the maximal friction torque available for braking, whereas the upper limit is always zero because no driving or positive torque is possible by friction brakes. $W^{max}(t)$ describes a real-time actuator limit embodied as a battery charging capacity constraint. W(t) describes the total power generated by the four electric motors at current time t.

Figure 7:
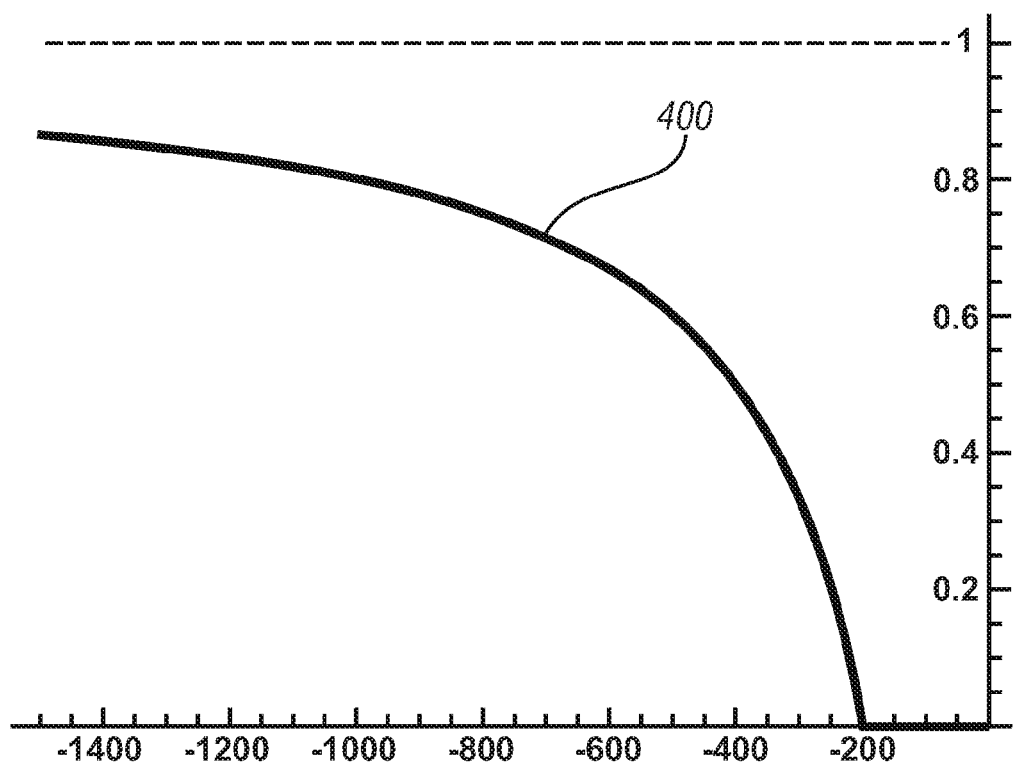
FIG. 7 depicts an exemplary friction braking distribution ratio as a function of desired total braking force, in accordance with the present disclosure.

FIG. 7 depicts an exemplary friction braking distribution ratio as a function of desired total braking force, in accordance with the present disclosure. The x-axis describes $Q^{desired}$, and the y-axis describes $\lambda$ for an arbitrary wheel, where the index is omitted. The exemplary curve 400 depicted can be expressed as follows.

$$\lambda = \left(1 - \frac{Q^{m\_min}}{Q^{desired}}\right) H(Q^{m\_min} - Q^{desired}) \quad [29]$$

Figure 8:
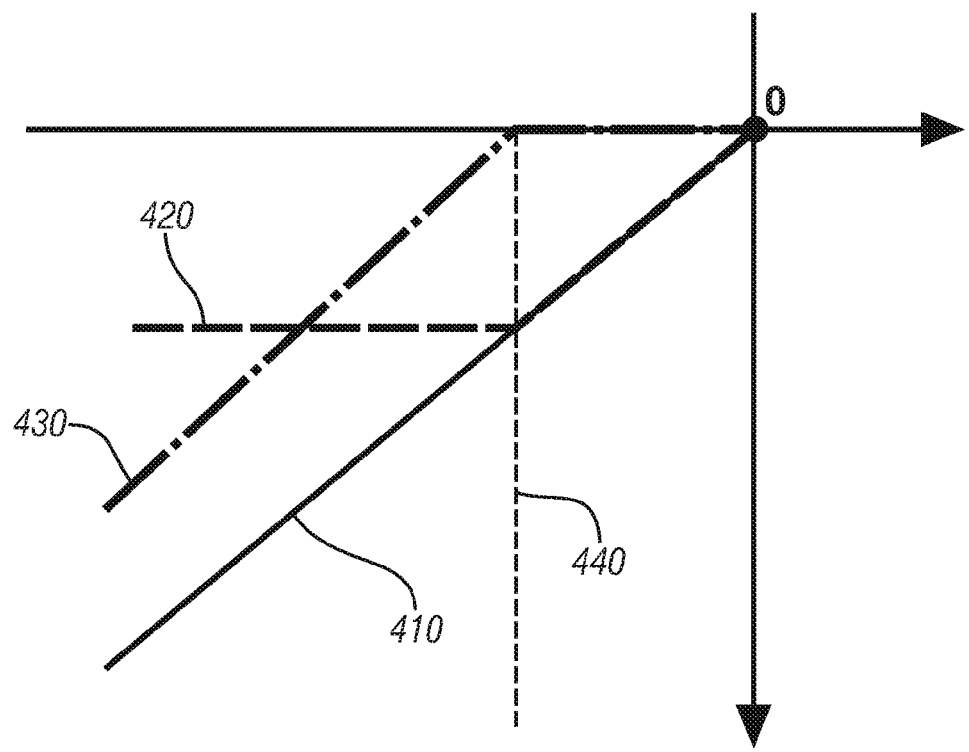
FIG. 8 depicts both a friction braking torque and a regenerative braking torque as components of a desired total braking torque, in accordance with the present disclosure.

H(x) describes the Heaviside unit-step function, which is zero at x<0 and one at x≥0. As depicted in FIG. 7, small $Q^{desired}$ values correspond to $\lambda$ values of zero, indicating that the regenerative braking can be utilized to fulfill $Q^{desired}$. As $Q^{desired}$ values increase or become more negative, $\lambda$ values increase nonlinearly. However, the corresponding regenerative and friction brake torques are piecewise linear functions of the desired torque as shown in FIG. 8. FIG. 8 depicts both a friction braking torque and a regenerative braking torque as components of a desired total braking torque, in accordance with the present disclosure. The x-axis describes $Q^{desired}$ values, and the y-axis describes resultant regenerative and friction braking torque. $Q^{desired}$ depicted as a plot 410 increasing with a one to one slope as $Q^{desired}$ increases or becomes increasingly negative. As described above, one embodiment of the methods herein includes utilizing regenerative braking exclusively to provide braking torque until $Q^{m\_min}$ is reached. $Q^m$ is depicted as plot 420. $Q^{m\_min}$ is depicted as line 440, and $Q^m$ is depicted to become increasingly negative with plot 410 while $Q^{desired}$ is between zero and $Q^{m\_min}$. Once $Q^{desired}$ reaches $Q^{m\_min}$, $Q^m$ stops varying. Any further increase or increasingly negative value of $Q^{desired}$ value comes from increasing $Q^b$ values depicted as plot 430. In this way, $Q^{desired}$ is distributed between $Q^m$ and $Q^b$ based upon the increasingly negative value of $Q^{desired}$.

$\lambda$ can be optimized for every corner of the vehicle, such that each corner utilizes regenerative braking at that corner until $Q_i^{m\_min}$ is reached. $Q_i^m$ for any corner of the vehicle can be described by the following.

$$Q_i^m = (1-\lambda_i) Q_i^{desired} \quad [30]$$

For wheels including a plurality of braking systems, $\lambda_i$ can be utilized to distribute torque between regenerative braking and friction braking at that corner. For wheels only including regenerative braking, $\lambda_i$ can be utilized to distribute torque to other wheels of the vehicle, for example, utilizing regenerative braking in the wheel without friction braking to provide a desired braking torque for the wheel up to a braking torque limit for that wheel and distributing a remaining portion of the desired braking torque for the wheel to another wheel of the vehicle that includes a friction brake. In an exemplary front wheel of the configuration depicted in FIG. 1 including both regenerative braking and friction braking, $Q_1^b$ can be described by the following:

$$Q_1^b = (\lambda_1 + \epsilon_1) Q_1^{desired} \quad [31]$$

$\epsilon_1$ is a compensation parameter that can be used to increase $Q_1^b$ based upon factors including $\lambda$ values for the wheels that do not have friction braking. An exemplary expression for $\epsilon$ corresponding to the exemplary configuration of FIG. 1 can include the following.

$$\epsilon_1 = \left(\lambda_3 \frac{Q_3^{desired}}{Q_1^{desired}}\left(1 + \frac{a}{T}\tan\delta\right) + \lambda_4 \frac{Q_4^{desired}}{Q_1^{desired}} \frac{a}{T}\tan\delta\right) \sec\delta \quad [32]$$

Equation 32 and similar equation for another front wheel together represent an explicit solution of optimization problem depicted in Equation 25. In the exemplary embodiment of FIG. 1, the front wheels are steerable and only regenerative braking is enabled on the rear wheels of the vehicle. Equation 32 describes adjusting $\epsilon_1$ based upon $\lambda_3$ and $\lambda_4$ values for both real wheels, redistributing braking torque to the friction brakes based upon the capacity of the rear wheels to regenerative brake. Further, Equation 32 compensates $\epsilon_1$ based upon a steering angle of the front wheels, $\delta$. The term $\alpha$ describes a longitudinal distance from the center of the front wheels to the center of gravity of the vehicle. In this way, the braking forces of different braking systems of the vehicle can be managed and braking torque can be distributed. In another non-limiting example, braking torque can be distributed between wheels of the vehicle based upon remaining capacity of the regenerative brakes. For example, in the configuration of FIG. 1, if any of the in-wheel motors of the front wheels has a higher brake torque limit than some of the in-wheel motors of the rear wheels, then a method can redistribute a portion of $Q_{3,4}^{desired}$ in excess of $Q_{3,4}^{m\_min}$ to $Q_{1,2}^{m}$ through an equation similar to Equation 31 modifying $Q_1^m$ or $Q_2^m$.

Distribution of braking torque can include other factors affecting braking. Another exemplary factor takes into account total power management for the vehicle. According to one embodiment, $\lambda_i$ values as determined by Equation 28 can be adjusted according to the following.

$$\lambda_i = \left(1 - \frac{Q_i^{m\_min}}{Q_i^{desired}}\right) H(Q_i^{m\_min} - Q_i^{desired}) - \zeta_i n_i \quad [33]$$

Figure 9:
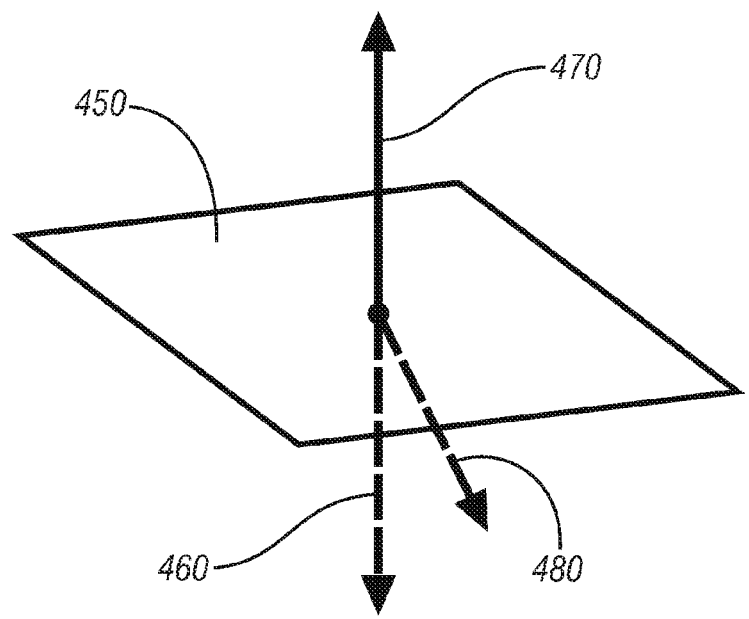
FIG. 9 depicts a power constraint hyper plane describing battery power constraints, in accordance with the present disclosure.

The term $-\zeta_i n_i$ modifies Equation 29 in order to reduce regenerative braking as the total power W(t) described by Equation 28 is reaching its maximal value as shown in FIG. 9, which depicts a power constraint hyper plane describing battery power constraints, in accordance with the present disclosure. Hyper plane 450 is considered in the coordinate space $\{\lambda_1 \ldots, \lambda_4\}$ and depicts a surface upon which $W=W^{max}$. Vector 470 is the normal to plane 450 and determines the direction of quickest power increase, whereas along the plane 450 the power is constant. According to Equation 28, vector 470 is calculated as follows.

$$n = \frac{N}{|N|} = \{n_1, n_2, n_3, n_4\}; n_i = \omega_i Q_i^{desired}; i = 1, \ldots 4 \quad [34]$$

Figure 10:
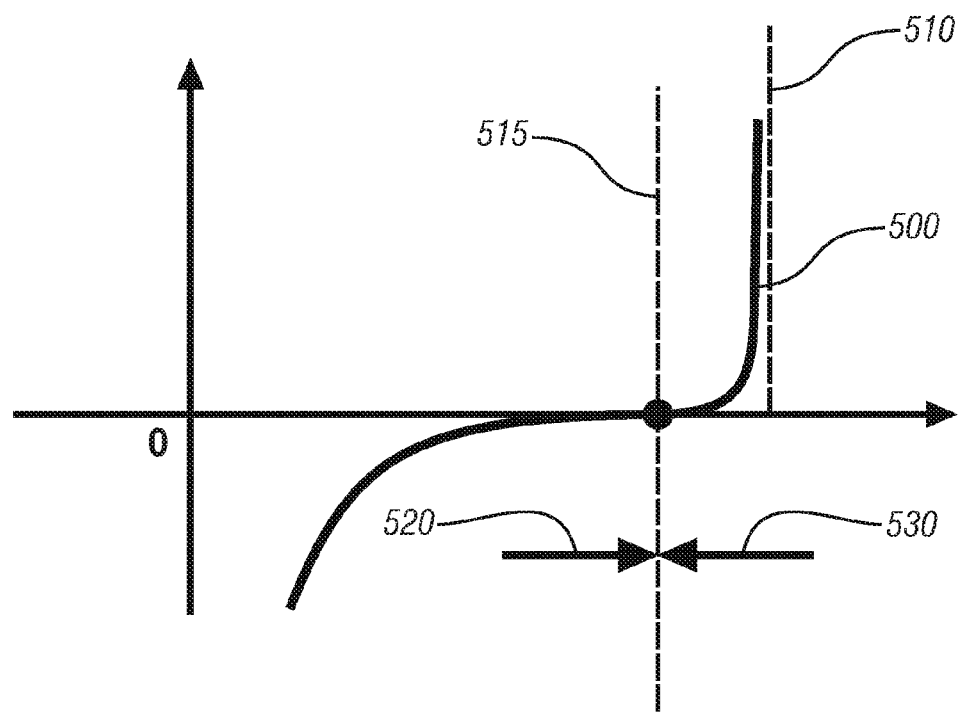
FIG. 10 depicts behavior in a requested power region, an undesired power region, and selection of a desired equilibrium, in accordance with the present disclosure.

The region above plane 450 describes prohibited half-space, while the region below plane 450 describes allowed half space. Vector 460 represents the direction of a quickest escape from the constraint based upon the meaning of the normal vector 470. Line 480 represents a weighted escape. An exemplary weighted escape may not coincide with vector 460 and can be described by the following set of components: $-\{\zeta_1 n_1, \zeta_2 n_2, \zeta_3 n_3, \zeta_4 n_4\}$, where the weights are described by the following.

$$\zeta_i = \zeta(W - W^{max}; r_{xi} r_{yi}) \quad [35]$$

wherein, $\zeta$ describes a function illustrated by FIG. 10, and $$r_{xi} = r_{xi}(|Q_i^{desired} - Q_i^{actual}|) \quad [36]$$

and $$r_{yi} = r_{yi}(|Q_i^{desired} - Q_i^{actual}|) \quad [37]$$

describe parameters of the function that may depend on errors between desired and actual total torques on each of the wheels. The parameters $r_{xi}$ and $r_{yi}$ are to modify the scales along the horizontal and vertical axes, respectively, and may affect escape rates from plane 450 in FIG. 9.

FIG. 10 depicts behavior in a requested power region, an undesired power region, and selection of a desired equilibrium, in accordance with the present disclosure. The x-axis describes the current total power W produced by braking, and the y-axis describes the weight given by Equation 35. Line 500 shows an exemplary operation of $\zeta$. Line 510 is depicted, describing $W^{max}$. Line 515 is depicted, describing the W value whereat plot 500 reaches zero. Region 520 depicts a requested power region, and region 530 depicts an undesired power region. The W value indicated by line 515 describes a desired equilibrium. By managing $\zeta_i n_i$, quick escape from the total power constraint can be achieved with minimal violation of the desired corner force and moment distribution and the distributed braking torque commands.

The above methods describe exemplary equations and terms based upon the configuration of FIG. 1. However, it will be appreciated that the equations can be easily modified based upon other configurations, for example, including a vehicle with friction brakes at all four wheels, a vehicle with regenerative brakes at only two wheels, or vehicle configurations with other than four wheels.

The above methods describe methods of vehicle control that can be used to control vehicle systems. Vehicle systems can take many embodiments. For example, a powertrain is depicted in FIG. 1 including a plurality of electric motors. A number of different embodiments of a powertrain can be utilized. For example, a combination of a motor or motors with an internal combustion engine can be utilized. Additionally, different or parallel energy sources can be utilized, for example, including chemical batteries, a hydrogen fuel cell device, or a photovoltaic device. In another example, a powertrain can include separate or in-wheel motors driving each wheel of the vehicle. In such a vehicle, the methods described herein can be utilized to provide different torque commands to each of the wheels. In another exemplary embodiment, a powertrain can include selective all-wheel drive, traction control, horizontal stability control, or other systems that modulate power to the various wheels of the vehicle. Such systems and the modulation of power to the various wheels can be incorporated in the methods described herein through the determined desired corner force and moment distribution. Braking can similarly include a number of embodiments and selective activation of systems. For example, a vehicle can include regenerative braking at the wheels or can include typical brakes at the wheels and include selective engine braking, for example, capable of regenerating energy to an energy storage device through the engine braking. Selective braking on one side of a vehicle or increased braking on one side of a vehicle can aid in creating a desired corner force or moment distribution. Selective activation or modulation of the properties of anti-lock braking at different wheels can be used to create a desired corner force or moment distribution. Vehicle steering systems can take a number of embodiments, including front wheel steering, rear wheel steering, and four wheel steering according to methods known in the art. A number of different vehicle configurations and system combinations are envisioned, and the disclosure is not intended to be limited to the particular exemplary embodiments described herein.

The above embodiments of the vehicle control method primarily treat vehicle forces and moments as existing in a two-dimensional plane close to or coincident with the horizontal ground plane. However, it will be appreciated that a third dimension can be utilized in vehicle control methods. By addition of similar modules and constraints in a third-dimension, it will be appreciated that vehicle control methods can be described that include three dimensions of control including, for example, forward and rearward roll of the vehicle body in relation to the chassis of the vehicle and corresponding corner force and moments to maintain control over the vehicle. A roll control system is known to control dynamics of a vehicle body in relation to a vehicle chassis. Such control can be based upon information in either three dimensions or information in two dimensions and estimating an effect of that two dimensional data to roll.

The above methods describe utilizing a desired corner force and moment distribution describing desired braking torques for wheels of the vehicles to distribute braking torques to various braking devices at the different wheels. FIG. 4 describes an actuator supervisory control module inputting the desired corner force and moment distribution and outputting commands to various actuators based upon the input. The actuator supervisory control module in one embodiment applies the various methods described herein to implement control of the various braking devices based upon the desired corner force and moment distribution.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control a vehicle having a plurality of wheels including control of regenerative brakes and friction brakes, comprising:
monitoring a desired total braking torque for the vehicle based on a desired operator braking command;
monitoring a desired corner force and moment distribution describing a desired force and moment of each corner of the vehicle, wherein each corner of the vehicle corresponds to a respective one of the plurality of wheels;
determining a respective desired individual braking torque for each wheel to achieve the desired total braking torque for the vehicle based on the desired corner force and moment distribution;
monitoring real-time actuator constraints comprising a respective braking torque limit of each of the regenerative brakes;
determining a respective regenerative braking torque for each of the wheels having respective regenerative brakes, each respective regenerative braking torque based upon the desired corner force and moment distribution and the respective braking torque limit of the respective regenerative brake;
determining a respective friction braking torque for each of the wheels having respective friction brakes, each respective friction braking torque based upon the desired corner force and moment distribution and the determined regenerative braking torque for each of the regenerative brakes; and
controlling the vehicle based upon the determined regenerative braking torques and the determined friction braking torques, comprising:
for a corresponding one of the wheels having a regenerative brake and not having a friction brake
utilizing the respective regenerative braking torque for the corresponding wheel up to the respective braking torque limit,
monitoring if a remaining portion of the respective desired individual braking torque for the corresponding wheel exists based on a difference between the respective desired individual braking torque and the respective braking torque limit for the corresponding wheel, and
when the remaining portion of the respective desired individual braking torque exists after the respective braking torque limit is reached, distributing the remaining portion of the respective desired individual braking torque in excess of the respective braking torque limit for the corresponding wheel to one or more other wheels using respective ones of the friction braking torques corresponding to the one or more other wheels.

2. The method of claim 1, wherein controlling the vehicle based upon the determined regenerative braking torques and the determined friction braking torques further comprises:
for each wheel of the vehicle having a respective regenerative brake and a respective friction brake, utilizing the respective regenerative braking torque for the respective regenerative brake up to the respective braking torque limit before utilizing the respective friction braking torque for the respective friction brake to achieve the respective desired individual braking torque.

3. Method to control a vehicle including control of regenerative brakes and friction brakes, comprising:
monitoring a desired total braking torque for the vehicle based on a desired operator braking command;
monitoring a desired corner force and moment distribution, wherein each corner of the vehicle corresponds to a respective one of the plurality of wheels;
determining a respective desired individual braking torque for each wheel to achieve the desired total braking torque for the vehicle based on the desired corner force and moment distribution;
monitoring real-time actuator constraints comprising a braking torque limit of each of the regenerative brakes;
determining a respective regenerative braking torque for each of the regenerative brakes, each respective regenerative braking torque based upon the desired corner force and moment distribution and the respective braking torque limit of the respective regenerative brake;
determining a respective friction braking torque for each of the friction brakes, each respective friction braking torque based upon the desired corner force and moment distribution and the determined regenerative braking torque for each of the regenerative brakes; and
controlling the vehicle based upon the determined regenerative braking torques and the determined friction braking torques comprising:
for a corresponding one of the wheels having a regenerative brake and not having a friction brake utilizing the regenerative braking torque for the corresponding wheel up to the respective braking torque limit, monitoring if a remaining portion of the respective desired individual braking torque for the corresponding wheel exists based on a difference between the respective desired individual braking torque and the respective braking torque limit for the corresponding wheel, and when the remaining portion of the respective desired individual braking torque exists after the respective braking torque limit is reached, distributing any portion of the respective desired individual braking torque in excess of the braking torque limit for the corresponding wheel to another wheel using the respective friction braking torque corresponding to the other wheel.

4. Method to control a vehicle having a plurality of wheels including control of regenerative brakes and friction brakes, comprising:

monitoring a desired total braking torque for the vehicle based on a desired operator braking command;

monitoring a desired corner force and moment distribution describing a desired force and moment of each corner of the vehicle, wherein each corner of the vehicle corresponds to a respective one of the plurality of wheels;

determining a respective desired individual braking torque for each wheel to achieve the desired total braking torque for the vehicle based on the desired corner force and moment distribution;

monitoring real-time actuator constraints comprising a respective braking torque limit of each of the regenerative brakes;

determining a respective regenerative braking torque for each of the wheels having respective regenerative brakes, each respective regenerative braking torque based upon the desired corner force and moment distribution and the respective braking torque limit of the respective regenerative brake;

determining a respective friction braking torque for each of the wheels having respective friction brakes, each respective friction braking torque based upon the desired corner force and moment distribution and the determined regenerative braking torque for each of the regenerative brakes; and controlling the vehicle based upon the determined regenerative braking torques and the determined friction braking torques, comprising:

for a corresponding one of the wheels having a regenerative brake and not having a friction brake utilizing the respective regenerative braking torque for the corresponding wheel up to the respective braking torque limit, monitoring if a remaining portion of the respective desired individual braking torque for the corresponding wheel exists based on a difference between the respective desired individual braking torque and the respective braking torque limit for the corresponding wheel, and when the remaining portion of the respective desired individual braking torque exists after the respective braking torque limit is reached, distributing the remaining portion of the respective desired individual braking torque in excess of the respective braking torque limit for the corresponding wheel to a plurality of other wheels using respective ones of friction braking torques corresponding to respective ones of the plurality of other wheels.

5. The method of claim 1, wherein determining the respective regenerative braking torque for each of the regenerative brakes based upon the desired corner force and moment distribution and the respective braking torque limit of the respective regenerative brake:

determining a friction braking distribution ratio for each of the plurality of wheels based upon the respective desired individual braking torque and the real-time actuator constraints, said friction braking distribution ratio comprising a ratio of the friction braking torque to the desired braking torque for each of the plurality of wheels; and determining the regenerative braking torque for each of the regenerative brakes further based upon the friction braking distribution ratio for the corresponding wheel.

6. The method of claim 1, further comprising monitoring a steering angle for each of a plurality of wheels of the vehicle having a respective friction brake; and wherein determining the friction braking torque for each of the friction brakes is further based upon the steering angle.

7. Method to control a vehicle having a plurality of wheels including control of regenerative brakes and friction brakes, comprising:

monitoring a desired total braking torque for the vehicle based on a desired operator braking command;

monitoring a desired corner force and moment distribution describing a desired force and moment of each corner of the vehicle, wherein each corner of the vehicle corresponds to a respective one of the plurality of wheels;

determining a respective desired individual braking torque for each wheel to achieve the desired total braking torque for the vehicle based on the desired corner force and moment distribution;

monitoring real-time actuator constraints comprising a respective braking torque limit of each of the regenerative brakes;

determining a respective regenerative braking torque for each of the wheels having respective regenerative brakes, each respective regenerative braking torque based upon the desired corner force and moment distribution and the respective braking torque limit of the respective regenerative brake;

determining a respective friction braking torque for each of the wheels having respective friction brakes, each respective friction braking torque based upon the desired corner force and moment distribution and the determined regenerative braking torque for each of the regenerative brakes; and controlling the vehicle based upon the determined regenerative braking torques and the determined friction braking torques, comprising:

for a corresponding one of the wheels having a regenerative brake and not having a friction brake utilizing the respective regenerative braking torque for the corresponding wheel up to the respective braking torque limit, monitoring if a remaining portion of the respective desired individual braking torque for the corresponding wheel exists based on a difference between the respective desired individual braking torque and the respective braking torque limit for the corresponding wheel, and when the remaining portion of the respective desired individual braking torque exists after the respective braking torque limit is reached, distributing the remaining portion of the respective desired individual braking torque in excess of the respective braking torque limit for the corresponding wheel to a plurality of other wheels using respective ones of regenerative braking torques corresponding to respective ones of the plurality of other wheels.

8. Method to control a vehicle having a plurality of wheels including control of regenerative brakes and friction brakes, comprising:

monitoring a desired total braking torque for the vehicle based on a desired operator braking command;

monitoring a desired corner force and moment distribution describing a desired force and moment of each corner of the vehicle, wherein each corner of the vehicle corresponds to a respective one of the plurality of wheels;

determining a respective desired individual braking torque for each wheel to achieve the desired total braking torque for the vehicle based on the desired corner force and moment distribution;

monitoring real-time actuator constraints comprising a respective braking torque limit of each of the regenerative brakes;

determining a respective regenerative braking torque for each of the wheels having respective regenerative brakes, each respective regenerative braking torque based upon the desired corner force and moment distribution and the respective braking torque limit of the respective regenerative brake;

determining a respective friction braking torque for each of the wheels having respective friction brakes, each respective friction braking torque based upon the desired corner force and moment distribution and the determined regenerative braking torque for each of the regenerative brakes; and controlling the vehicle based upon the determined regenerative braking torques and the determined friction braking torques, comprising:

for a corresponding one of the wheels having a regenerative brake and not having a friction brake utilizing the respective regenerative braking torque for the corresponding wheel up to the respective braking torque limit, monitoring if a remaining portion of the respective desired individual braking torque for the corresponding wheel exists based on a difference between the respective desired individual braking torque and the respective braking torque limit for the corresponding wheel, and when the remaining portion of the respective desired individual braking torque exists after the respective braking torque limit is reached, distributing the remaining portion of the respective desired individual braking torque in excess of the respective braking torque limit for the corresponding wheel to a plurality of other wheels using respective ones of both regenerative braking torques and friction braking torques corresponding to respective ones of the plurality of other wheels of the vehicle, each of the other wheels having respective regenerative brakes and respective friction brakes.

9. The method of claim 1, wherein monitoring real-time actuator constraints comprising the braking torque limit of each of the regenerative brakes comprises monitoring the braking torque limit of a respective regenerative brake located at each of a plurality of wheels of the vehicle.

10. The method of claim 1, further comprising determining a weighted escape from a total power constraint of batteries of the vehicle;

wherein determining the regenerative braking torque for each of the regenerative brakes is further based upon the weighted escape.

11. The method of claim 1, wherein monitoring the desired corner force and moment distribution comprises:

monitoring a desired vehicle force and moment;

monitoring real-time corner constraints upon vehicle dynamics comprising:

monitoring corner states of health for the vehicle; and monitoring corner capacities for the vehicle; and determining the desired corner force and the moment distribution based upon the desired vehicle force and moment and the real-time corner constraints.

12. The method of claim 1, wherein monitoring real-time actuator constraints further comprises a respective braking torque limit of each of the friction brakes; and wherein determining the friction braking torque for each of the friction brakes is further based upon the real-time actuator constraints.

13. Method to control a vehicle including control of regenerative brakes and friction brakes, comprising:

monitoring a desired total braking torque for the vehicle based on a desired operator braking command;

monitoring a desired corner force and moment distribution comprising a respective desired braking torque for each of a plurality of wheels of the vehicle;

determining a respective desired individual braking torque for each wheel to achieve the desired total braking torque for the vehicle based on the desired corner force and moment distribution;

monitoring real-time actuator constraints comprising a respective braking torque limit of each of the regenerative brakes;

determining a respective regenerative braking torque for each of the wheels having respective regenerative brakes, each respective regenerative braking torque based upon the desired corner force and moment distribution and the respective braking torque limit of the respective regenerative brake;

determining a respective friction braking torque for each of the wheels having respective friction brakes, each respective friction braking torque based upon the desired corner force and moment distribution and the respective regenerative braking torque for each of the regenerative brakes;

controlling the vehicle based upon the determined regenerative braking torques and the determined friction braking torques; and for one of the wheels having a regenerative brake and not having a friction brake:

setting the respective regenerative braking torque utilizing the respective regenerative brake for the corresponding wheel until the respective braking torque limit of the corresponding regenerative brake is reached, monitoring if a remaining portion of the respective desired individual braking torque for the corresponding wheel exists based on a difference between the respective desired individual braking torque and the respective braking torque limit for the corresponding wheel, and when the remaining portion of the respective desired individual braking torque exists after the respective braking torque limit is reached, distributing the remaining portion of the respective desired braking torque in excess of the respective braking torque limit for the corresponding wheel to one or more other wheels using respective ones of the friction braking torques corresponding to the one or more other wheels.

14. Apparatus to control a braking of a vehicle, comprising:
a plurality of regenerative brakes each operatively coupled to a wheel of the vehicle;
a plurality of friction brakes each operatively coupled to a wheel of the vehicle; and
an actuator supervisory control module:
  monitoring a desired total braking torque for the vehicle based on a desired operator braking command;
  monitoring a desired corner force and moment distribution describing a desired force and moment of each corner of the vehicle, wherein each corner of the vehicle corresponds to a respective one of the plurality of wheels;
  determining a respective desired individual braking torque for each wheel to achieve the desired total braking torque for the vehicle based on the desired corner force and moment distribution;
  monitoring real-time actuator constraints comprising a respective braking torque limit of each of the regenerative brakes;
  determining a respective regenerative braking torque for each of the wheels having respective regenerative brakes, each respective regenerative braking torque based upon the desired corner force and moment distribution and the respective braking torque limit of the respective regenerative brake;
  determining a respective friction braking torque for each of the wheels having respective friction brakes, each respective friction braking torque based upon the desired corner force and moment distribution and the respective regenerative braking torque for each of the regenerative brakes; and
  controlling the regenerative brakes and the friction brakes based upon the determined regenerative braking torques and the determined friction braking torques, comprising:
    for a corresponding one of the wheel having a regenerative brake and not having a friction brake utilizing the respective regenerative braking torque for the corresponding wheel up to the respective braking torque limit,
    monitoring if a remaining portion of the respective desired individual braking torque for the corresponding wheel exists based on a difference between the respective desired individual braking torque and the respective braking torque limit for the corresponding wheel, and
    when the remaining portion of the respective desired individual braking torque exists after the respective braking torque limit is reached, distributing the remaining portion of the respective desired individual braking torque in excess of the respective braking torque limit for the corresponding wheel to one or more other wheels using respective ones of the friction braking torques corresponding to the one or more other wheels.

15. The apparatus of claim 14, further comprising:
a corner dynamics control module:
  monitoring a desired vehicle force and moment;
  monitoring real-time corner constraints; and
  determining the desired force and the moment desired of each corner of the vehicle based upon the desired vehicle force and moment and the real-time corner constraints.

16. The apparatus of claim 14, further comprising:
two front wheels of the vehicle, each comprising:
  one of the regenerative brakes, and
  one of the friction brakes; and
two rear wheels of the vehicle, each comprising one of the regenerative brakes.

17. The apparatus of claim 16, wherein determining the respective friction braking torque for each of the friction brakes of the two front wheels is further based upon a friction braking distribution ratio for each of the two rear wheels, said friction braking distribution ratio comprising a ratio of the friction braking torque of the corresponding friction brake of the corresponding front wheel to the desired force and moment of the respective corner corresponding to the respective front wheel.

* * * * *